United States Patent

Tallegas

[15] 3,644,679

[45] Feb. 22, 1972

[54] HIGH-CAPACITY CONNECTING NETWORK HAVING BLOCKING CHARACTERISTICS FOR TIME-DIVISION SWITCHING

[72] Inventor: Francois Tallegas, Perros-Guirec, France

[73] Assignees: C.I.T.-Compagnie Industrielle Des Tele-Communications, Paris; Societe Lannionnaise D'Electronique, Lannion, France

[22] Filed: July 7, 1969

[21] Appl. No.: 839,551

[30] Foreign Application Priority Data

July 5, 1968 France....................................158143

[52] U.S. Cl.....................................................179/15 AQ

[51] Int. Cl.....................................................H04j 3/00

[58] Field of Search......................179/15 AT, 15 AQ, 18 GF

[56] References Cited

UNITED STATES PATENTS

| | | | |
|---|---|---|---|
| 3,263,030 | 7/1966 | Stiefel et al. | 179/15 AT |
| 3,458,659 | 7/1969 | Sternung | 179/15 AT |
| 3,281,537 | 10/1966 | Dupieux | 179/15 AQ |
| 3,090,836 | 5/1963 | Bezdel | 179/15 AQ |
| 3,420,962 | 1/1969 | Warman | 179/18 GE |

*Primary Examiner*—Kathleen H. Claffy
*Assistant Examiner*—David L. Stewart
*Attorney*—Sughrue, Rothwell, Mion, Zinn & Macpeak

[57] ABSTRACT

A connection network having blocking which is formed like a perfect linked system including a first switching stage consisting of a certain number of buffer storages with their addressing and reading systems, as well as a second switching stage consisting of gates associated with a certain number of distributors, the two switching stages being connected together by links and each distributor being accessible by only one link connecting it to the first switching stage, whereas a certain number of links are reserved for reciprocal overthrow.

4 Claims, 6 Drawing Figures

HIGH-CAPACITY CONNECTING NETWORK HAVING BLOCKING CHARACTERISTICS FOR TIME-DIVISION SWITCHING

BACKGROUND OF THE INVENTION

1. Field of the Invention

The present invention relates to a high-capacity connecting network having blocking characteristics for time-division switching which may be employed notably in a four-wire switching center.

2. Description of the Prior Art

An unblocked connecting network is already known from French Pat. No. 1,511,678 of the 23rd Dec., 1966 in the name of the applicants which corresponds to U.S. application Ser. No. 692,144 filed Dec. 20, 1967, now abandoned, but although the construction of such an unblocked connecting network is perfectly practicable in the case of small capacities, is encounters difficulties in the case of a high-capacity network. The most important of these difficulties is due to the fact that the various items of information or words corresponding to the incoming time-division channels must be readable from a common buffer memory during a common secondary time-division channel along $N_1$ junction lines addressed by $N_1$ address lines. When the words of incoming lines are routed along a junction line towards $N_2$ outgoing lines having each P channels or primary channels, it is necessary that during the time of a primary channel a junction line route $N_2$ words, and it is said that, on a junction line, a primary channel is divided into $N_2$ secondary time-division channels, an incoming or outgoing line is called a primary multiplex, and a junction line is called a secondary multiplex. Two ways of constructing such an unblocked network are known:

1. Commercial memory blocks are used, which generally speaking, have only one addressing and reading circuit. In order to achieve the proposed object, it is necessary to multiply by $N_1$ the number of memory blocks strictly necessary. Each junction line then possesses its own buffer memory block in which all the incoming NP time-division channels are written.

2. Elemental memory points are used to which it is desirable to add individual addressing circuits and reading gates in the direction of each junction line.

These two possible forms of high-capacity unblocked connecting networks involve a superabundance of members and are consequently costly in the present state of the art.

SUMMARY OF THE INVENTION

The invention has for its object to obviate these disadvantages by providing a high-capacity connecting network having blocking characteristics.

As in conventional switching, the object in view is confined to creating a connecting network having internal blocking characteristics, i.e., one in which a certain probability of loss of communications is tolerated, which makes it possible to combine a grade of service which is considered sufficient with reasonable cost.

It is known that, in time-division switching, the connecting network has the object of routing along N outgoing network lines each having P time-division channels the intelligences contained in N incoming network lines having P time-division channels, it being understood that, in general, the intelligences contained in the *p*th time-division channel of the *n*th incoming network line may be routed along the *p'*th time-division channel of the *n'*th outgoing line, *p*, *n*, *p'* and *n'* having any values and it being possible for all the NP incoming time-division channels to be routed along the NP outgoing time-division channels.

The connecting network according to the invention is characterized in that during a common secondary time-division channel only a word contained in a network line and stored in a buffer memory can be read, along one junction line.

In accordance with one feature of this invention, the connecting network is in the form of a perfect linked system comprising a first junction group stage consisting of buffer memories with their addressing and reading system, and a second junction group stage consisting of gates, the two junction group stages being connected by links, and each second junction group being accessible only through a link emanating from a first junction group.

In accordance with another feature of this invention, there is employed as buffer memory a memory block comprising a single addressing and reading circuit, which can store the words preferably contained in the 16 time-division channels of an incoming network line, which corresponds to one-half of a line multiplex or primary multiplex, each word being composed of Q bits.

In accordance with another feature of the invention, the address lines coming from the control memories are subdivided into memory address lines (LAM), in which there is situated, for each secondary time-division channel, the address (one out of N) of the buffer memory from which the information is to be taken, and into word address lines (LAP) in which there is situated the address of the word of the buffer memory (one out of 16).

In accordance with another feature of this invention, the words addresses are regrouped at the level of the buffer memories in intermediate point address lines (LAPI) so that, for example, there arrive at the buffer memory *n* the address line ($LAPI_n$) in which there is found, for a given time-division channel, the address of a word which was situated in any one of the control memories with the address *n* of the buffer memory under consideration.

In accordance with another feature of the invention, there are present at the output of the index buffer memory *n*, in the intermediate junction line ($LJI_n$), the Q bits contained in the corresponding memory word, these Q bits being routed along the appropriate junction line by means of the decoded memory address.

In accordance with one embodiment of the invention, the connecting system consists essentially of:

1. N buffer memories, one per incoming network line, each having P memory words, one per time-division channel, which are themselves composed of Q elemental memory bits, in which there are temporarily stored the P × N words contained in the N incoming network lines;

2. $N_1$ junction lines, in each of which there are time-multiplexed the $P \times N_2$ words intended for a group of $N_2$ outgoing network lines ($N_1N_2 \geq N$);

3. $N_1$ control memories, each of which contains the addresses of the buffer memory and of that work of this buffer memory at which it is necessary to seek the Q bits intended for each of the time-division channels of the $N_2$ outgoing network lines of the group served by a junction line associated with a control memory;

4. $N_1$ distributors which route from the junction lines the words intended for the $N_2$ network lines of the group;

5. $N_1$ word address lines and $N_1$ memory address lines, of each control memory emanating from a word address line and a memory address line;

6. $N_1$ decoders for distributing the memory addresses among the N buffer memories;

7. $N_1 \times N$ AND gates for distributing the digit *p* among the N buffer memories from the $N_1$ control memories;

8. N OR gates for distributing a single digit *p* to a buffer memory at a given instant;

10. N intermediate junction lines LJI extending from the buffer memories for distributing among the various junction lines the Q bits contained in the buffer memory word of address *p*;

11. $N_1 \times N$ AND gates opening up to the aforesaid Q bits of the intermediate junction line the path of the junction line corresponding to the control memory in which the word *p* was stored; and 12. $N_1$ OR gates for regrouping along the junction lines the words emanating from the various buffer memories.

BRIEF DESCRIPTION OF THE DRAWINGS

Further features and advantages of this invention will become apparent in the course of the detailed description given in the following with reference to the drawings, in which.

DESCRIPTION OF THE PREFERRED EMBODIMENT

Figure 1:
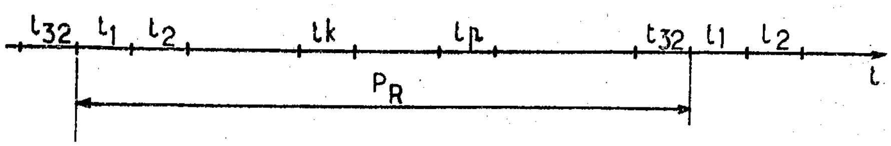
FIG. 1 illustrates a primary multiplex.

The primary multiplex illustrated in FIG. 1 is applied to an incoming or an outgoing network line which comprises 32 primary time-division channels numbered $t_1, t_2, \ldots t_k, t_p, \ldots t_{32}$. The repetition period $P_R$ is the inverse of the sampling frequency the latter being *i* kc./s., the duration of the cycle is therefore 125 microseconds and the duration of a time-division channel $t_p$ about 3.9 microseconds.

Figure 2:
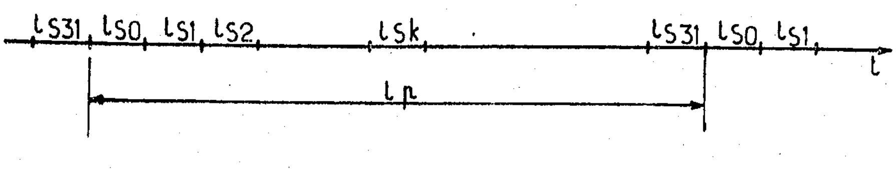
FIG. 2 illustrates a secondary multiplex both along the address lines and along the junction lines.

The secondary multiplex illustrated in FIG. 2 is applied to the memory and word address lines, to the junction lines and to the intermediate junction lines. This primary time-division channel is itself divided into 32 secondary time-division channels number $t_{s0}, t_{sl}, t_{s2}, \ldots t_{s31}$. One of these secondary time-division channels $t_{s0}$ is being reserved for the writing in the buffer memory, the others being reserved for the reading of the buffer memories intended for the junction lines.

Figure 3:
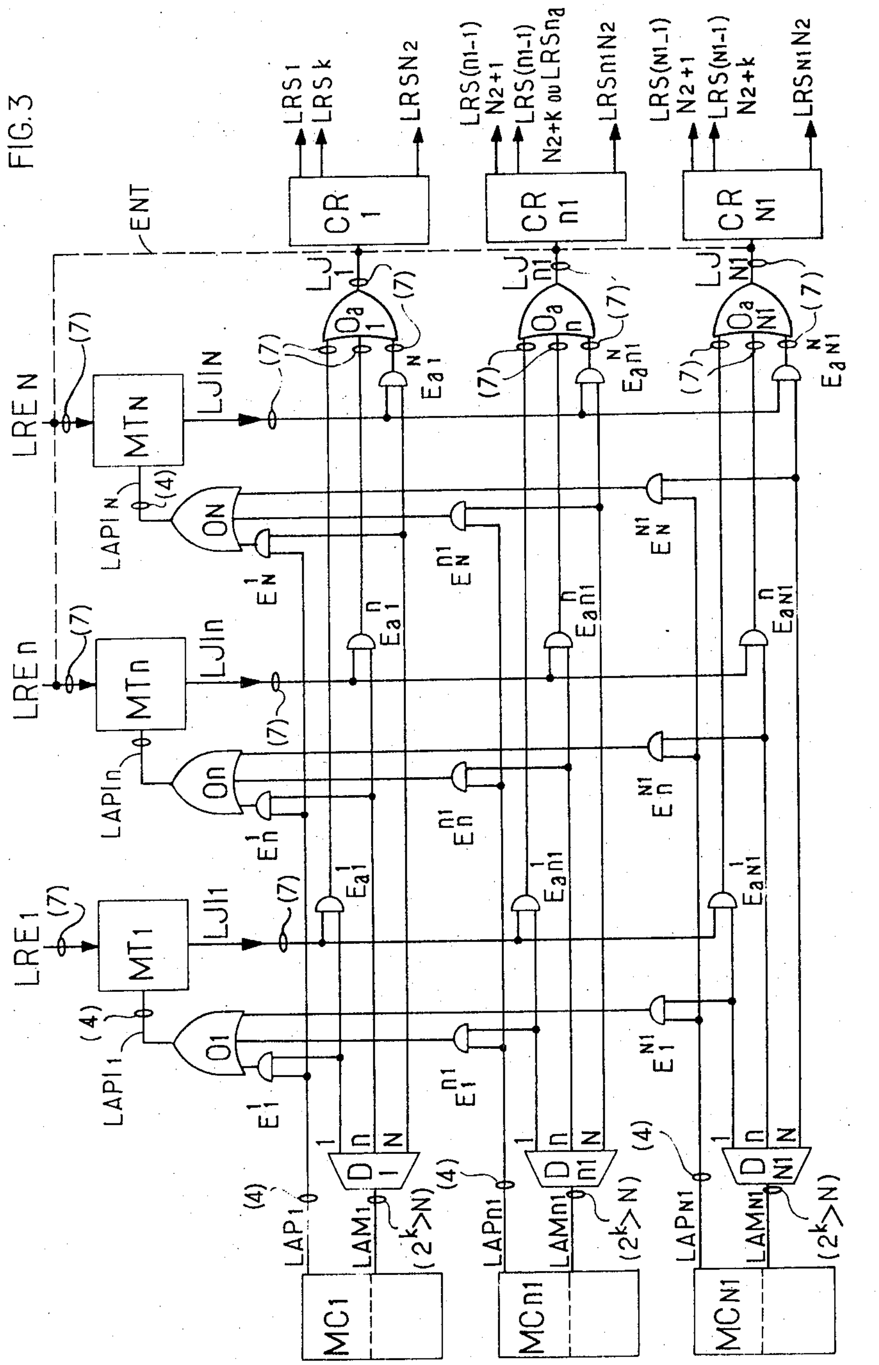
FIG. 3 diagrammatically illustrates a time-division connecting network according to the invention.

FIG. 3 shows another form of a connecting network according to the invention. It comprises N incoming network lines denoted by $LRE_1, LRE_2, \ldots LRE_n \ldots LRE_N$. Each incoming network line corresponds for example to one-half of a primary multiplex and therefore comprises 16 primary time-division channels. There corresponds to each incoming network line one buffer memory: $MT_1$ to $LRE_n, \ldots MT_N$ to $LRE_1$. Each buffer memory consists of a commercially obtainable memory block having a single addressing and reading circuit, in which there may be stored the words contained in 16 time-division channels. In fact, since the words are encoded in binary form with seven wires, each memory block comprises seven memories (one to each wire) and each memory comprises 16 words corresponding to the 16 time-division channels.

It may be noted that the incoming network line as here defined need not really exist; it is then regarded as a simple means of representation. For example, a primary multiplex composed of 32 time-division channels which is to be written into two buffer memories of 16 channels may be integrally presented to the input of these buffer memories. Only the writing address lines which have not hitherto been referred to, either here or in the earlier patent, permit of defining that part of the primary multiplex which is written into one or other of the buffer memories.

The network also comprises $N_1$ control memories denoted by $MC_1, MC_1, \ldots MC_{nl}, \ldots MC_{N1}$. Associated with each control memory are a junction line and a distributor giving access to a group of outgoing network lines. Thus, there are associated with the control memory $MC_1$ the junction line $LJ_1$ and the distributor $CR_1$ giving access to $N_2$ outgoing network lines from $LRS_1$ to $LRS_2$, with the control memory $MC_{nl}$, the junction line $LJ_{nl}$ and the distributor $CR_{nl}$ giving access to $N_2$ other outgoing network lines $LRS_{(nl-1)}N_2+1$ to $LRS_{nl}N_2, \ldots$, etc. Each control memory writes, under the action of external control means not shown in the diagram and for each channel of the $N_2$ outgoing lines of the distributor associated to a control memory by a junction line, the addresses of the buffer memory and of that word of this buffer memory at which it is necessary to seek the Q bits intended for a channel of the said $N_2$ outgoing network lines. Each control memory can therefore write the addresses of any time-division channel of any incoming network line, provided however that the said control memory serves the outgoing network line of which a time-division channel $p'$ must be brought into relationship with the time-division channel $p$ of the incoming network line, $p$ and $p'$ having any values. From each control memory there emanates a word address line and a memory address line. Thus, there emanate from the control memory $MC_1$ the word address line $LAP_1$ and the memory address line $LAM_1, \ldots$, from the control memory $MC_{nl}$ there emanate the word address line $LAP_{nl}$ and the memory address line $LAM_{nl}, \ldots$, etc. On a memory address line, there is found for each secondary time-division channel, the address (one out of N) of the buffer memory from which the information is to be taken, and on a word address line there is found, for each secondary time-division channel, the address of that word of the buffer memory (one out of 16) from which the information will be taken. If the information in the control memories is encoded in binary form, each word address line will therefore comprise four wires, while each memory address line will comprise a number of wires K such that $2^K \geq N$, K being the smallest integer satisfying the inequality. The rate of flow of information along each address line wire is 32×31×8,000 bits/sec. =8,192,000 bits/sec.

Each memory address line, such as $LAM_1$, for example, is connected to a decoder such as $D_1$ which has the object of distributing the AND gate opening signals concerning the various buffer memories. Hence, the connection 1 of $D_1$ collects the signal for opening the two AND-gates $E_1^1, E_{nl}^1$, concerning the buffer memory $MT_1$, the connection *n* of $D_1$ collects the signal for opening the two AND-gates $E_n^1, E_{nl}^n$, concerning the buffer memory $MT_n$, the connection N of $D_1$ collects the signal for opening the two AND-gates $E_N^1 E_{nl}^N$ concerning the buffer memory $MT_n$.

Each word address line, such as $LAP_1$ extracts the word addresses (one to 16) concerning any one of the buffer memories $MT_1$ to $MT_N$. An AND gate of which one input is allotted to the word address line and another input to the above-defined opening signal therefore permits of allotting the word address line to the buffer memory concerned. Therefore, $N_1$ word address gates E are found for each buffer memory. Thus, for the buffer memory $MT_1$, there is the gate $E_1^1$ relative to $MC_{n1}$, the gate $E_1^{N1}$ relative to $MC_{N1}, \ldots$, the gate $E_1^{N1}$ relative to $MC_{N1}$. The outputs of these various AND gates are applied to the input of the gate $O_1$ which is an OR gate. There is found at the output of this gate $O_1$ which constitutes the intermediate address line $LAPI_1$ the word address which was present at $LAP_1$. This digit is the only one which is found at $LAPI_1$ in a secondary time division channel *ts j* of a primary time division channel *tpi/*, because when the addresses are written in the control memory, it is arranged that this is so, whereby, in addition, the blocking is introduced. An analogous formation is found for each of the buffer memories. Generally speaking, there arrives at the buffer memory $MT_n$ the intermediate word address line $LAPI_n$, in which there is found for a given time-division channel the word address which was present in any one of the control memories with the address *n* of the buffer memory under consideration. It has already been noted that each word address line is in fact composed of four wires. Consequently, each gate E and each gate O will be composed of four gates, one at each wire.

The reading output of each buffer memory $MT_1, MT_n, MT_N$ is called the intermediate junction line $LJI_1, LJI_n, LJI_N$. Each intermediate junction line has as many time-division channels as the address lines and is in addition composed of seven wires in the same way as the network lines. Therefore, there are found in the secondary time-division channel concerned of the intermediate junction line the Q bits contained in the buffer memory word *p* previously sought.

The routing of these Q bits to the appropriate junction line is effected by means of the previously defined AND gate opening signal.

Thus, referring again to the example of the time-division channel $p$ in the network line $LRE_1$ to be brought into relationship with the time division channel $p'$ of the outgoing network line $LRS_K$ served by the control memory $MC_1$, there are read from an intermediate junction line $LJI_1$ the Q bits contained in the word $p$ of the buffer memory $MT_1$, which Q bits were contained in the word $p$ of the buffer memory $MT_1$ and were previously contained in the primary time-division channel $p$ of the network line $LRE_1$. The output 1 of the decoder $D_1$ opens the AND gate denoted by $E_{a1}{}^1$ and there are found through this gate and the OR gate denoted by Oal, in the junction line $LJ_1$, the Q bits contained in the word $p$ of the buffer memory $MT_1$. Assuming that the outgoing network line is $LRS_K$ and the secondary time division channel $tsk$, the distributor $CR_1$ connects $LJI_1$ to $LRS_K$ at the instant $tp'/tsk$ and there are found in he channel $p'$ of the outgoing network line $KRS_K$ the Q bits contained in the channel $p$ of the incoming network line $LRE_1$.

Each intermediate junction line is capable of distributing Q bits by word to any one of the groups of outgoing network lines, i.e., to any one of the junction lines. Thus, the intermediate junction line $LJI_1$ distributes its items of information among $LJ_1$, ..... $LJ_{nl}$, .... $LJ_{N1}$, respectively through the AND gates denoted by $E_{al}{}^1$, ... $E_{anl}{}^1$, .... and $E_{aNl}{}^1$; and the intermediate junction $LJN_n$ distributes its items of information among $LJ_1$, .... $LJ_{nl}$, .... $LJ_{N1}$, respectively through the AND gates denoted by $E_{al}{}^n$, .... $E_{anl}{}^n$, .... $E_{aNl}{}^n$, etc. There are therefore $N_1 \times N$ AND gates allocated to the intermediate junction lines. At the output, there are $N_1$ OR gates denoted by $Oa1$, $Oa2$, .... $OaN1$; there corresponds to each of these OR gates a group of N2 outgoing network lines ($N_2$=32 and corresponds to the secondary multiplex of an intermediate junction line). Each group of $N_2$ outgoing network lines is served by a junction line and a distributor. Hence, the first group of outgoing lines $LRS_1$, $LRS_2$, ... $LRS_K$, ... $LRS_{N2}$ is served by the junction line $LJ_1$ and the distributor $CR_1$, ... etc., and likewise for each group.

Figure 4:
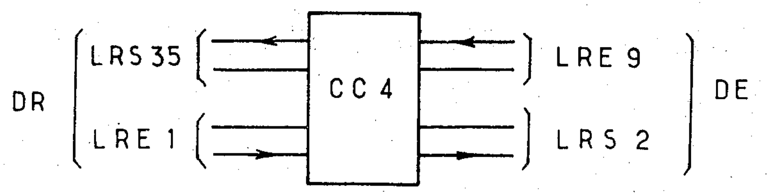
FIG. 4 illustrates by way of example a four-wire connection at the switching center on the calling side and the called side.

By way of practical example, the aforesaid device operates as follows. In a four-wire switching center CC4 (FIG. 4), there is obviously one outgoing two-wire channel and one return two-wire channel. Within the switching center, the outgoing channel and the return channel may be dissociated in order to facilitate the switching. For example, it will be assumed that the outgoing channel of the network line leads to the buffer memory $MT_1$ and that the return channel of the network line leads to the buffer memory $MT_9$.

With regard to the outgoing channel, it will be assumed that it is desired to find in the outgoing network line $LRS_2$ in the time-division channel 19 the Q bits contained in the time-division channel 15 of the incoming network line $LRE_1$.

With regard to the return channel, it will be assumed that it is desired to find in $LRS_{35}$, in the time-division channel 28, the Q bits contained in the time-division channel 8 of the incoming network line $LRE_9$.

It will first of all be seen what happens in the outgoing direction, i.e., the direction from the caller to the called subscriber.

The outgoing network lines $LRS_2$ is the second of the first group. There will therefore be found at the output of the control memory $MC_1$, at the instant $tp19/ts2$ at the memory address line $LAM_1$, the digit 1 (corresponding to $MT_1$) and at the word address line $LAP_1$ the digit 15 (15th primary time-division channel). The output 1 at the decoder $D_1$ opens the AND gate denoted by $E_1{}^1$ and there is found through this gate and the OR gate denoted by $O_1$ at the intermediate word address line $LAPI_1$ the digit 15, which was present at $LAP_1$. This digit is the only one which is found at $LAPI_1$ at the instant $tp19/ts2$, whereby the blocking is introduced. Within the buffer memory $MT_1$, the word 15 at $LAPI_1$ initiates the reading at the intermediate junction line $LJI_1$ of the Q bits contained in the word 15 of this buffer memory, which Q bits were previously contained in the primary time-division channel 15 of the incoming network line $LRE_1$. The output 1 of the decoder $D_1$ opens the AND gate denoted by $E_{al}{}^1$ and there are found through this gate and the OR gate denoted by Oal at the junction line $LJ_1$ the Q bits contained in the word 15 of the buffer memory $MT_1$.

During this instant $tp19/ts2$, the distributor $CR_1$ is connected to the outgoing network line $LRS_2$ and there are in fact found in the channel 19 of the outgoing network live 2 of the first group the Q bits contained in the channel 15 of the incoming network line $LRE_1$.

Exactly the same thing happens in the return direction, i.e., in the direction from the called subscriber to the calling subscriber.

The outgoing network lines $LRS_{35}$ is the third one of the second group, since each group of outgoing network lines comprises 32. There will therefore be found at the output of the control memory $MC_2$ at the instant $tp28/ts3$ in the memory address line $LAM_2$ the digit 9 (corresponding to $MT_9$) and in the word address line $LAP_2$ the digit 8 (eighth primary time-division channel). The output 9 of the decoder $D_2$ opens the AND gate denoted by $E_9{}^2$ and there is found through this OR gate denoted by $O_9$ in the intermediate word address line $LAPI_9$ the digit 8 which was present at $LAP_2$. This digit is the only one which is found at $LAPI_2$ at the instant $tp28/ts3$, whereby the blocking is introduced. Within the buffer memory $MT_9$, the digit 8 at $LAPI_9$ initiates the reading at the intermediate junction line $LJI_9$ of the Q bits contained in word 8 of this buffer memory, which Q bits were previously contained in the primary time-division channel 8 of the incoming network line $LRE_9$. The output 9 of the decoder $D_2$ opens the AND gate denoted by $E_{a2}{}^9$ and there are found through this gate and the OR gate denoted by Oa2 in the junction line $LJ_2$ the Q bits contained in the word 8 of the buffer memory $MT_9$. During this instant $tp28/ts3$, the distributor $CR_2$ is connected to the outgoing network line $LRS_{35}$ and there are in fact found in the channel 28 of the outgoing network line 3 of the second group the Q bits contained in the channel 8 of the incoming network line $LRE_9$.

The line numbers indicated above are obviously chosen only by way of example. As a general rule, there is a very close correlation in the numbering of the two transmission directions. Thus, as in carrier-current systems, the channel of the PCM systems will be numbered in the same way in both directions of transmission. Thus, the circuit 24 of the multiplex numbered 2 in a central office is found, for both directions of transmission, in the time-division channel 24 of the multiplex. In the central office, on the outgoing side, the multiplexes correspond to the outgoing network lines. The Q bits concerning this circuit are therefore to be found in the time-division channel 24 of the network line 2. On the incoming side, the multiplexes are subdivided into two incoming network lines in the example chosen. Thus, the multiplex 1 is subdivided in such manner that its odd channels are found in the incoming network line 1 and its even channels in the incoming network line 2. Therefore, the incoming side of the circuit 24 of the multiplex 2 will again be found in the time-division channel 12 of the line.

Figure 5:
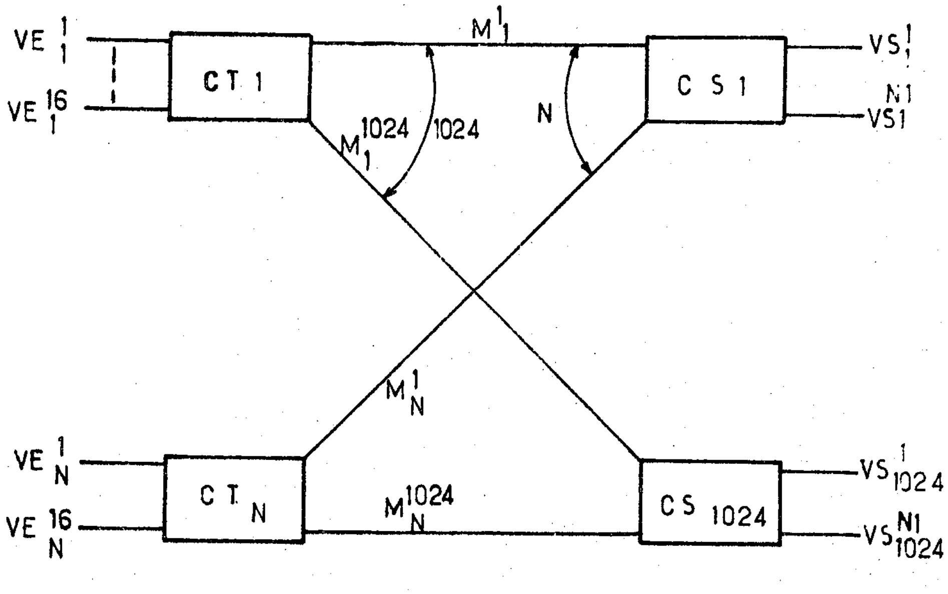
FIG. 5 is a space-division representation, conforming to conventional switching, of a time-division connecting network according to the invention.

FIG. 5 illustrates the space-division equivalent of the time-division connecting network according to the invention which has been described with reference to FIG. 3. It will be seen that it is a question of a perfect linked system employed in conventional switching. Such linked systems have, due to their very construction, a slight defect in the accessibility of the incoming lines to the outgoing lines, because, although there always exists one link by which any incoming line can be connected to any outgoing line, it may happen at certain times that no free outgoing line can be reached from a given incoming line, simply because the link or links which enable it to reach the free outgoing lines are all occupied. It is then said that there is internal blocking.

In the transposition from time-division to space-division as illustrated in FIG. 5, a first type of switch CT consists of the buffer memories with their addressing and reading system.

There arrive along an incoming network line 16 primary time-division channels, and in an intermediate junction line allocated to this network line there are found 32×32=1,024 secondary time-division channels. This is represented by a switch $CT_1$ having 16 inputs $VE_1^1$ to $VE_1^{16}$, of which the 1,024 links $M_1^1$ to $M_1^{1,024}$ are the outputs. There are therefore as many switches CT as there are incoming network lines. If there are N network lines, the last switch is $CT_N$, the inputs of which are numbered $VE_N^1$ to $VE_N^{16}$. The set of switches $CT_1$ to $CT_N$ constitute the first stage of the connecting network.

The second stage of the connecting network consists of the AND and OR gates which regroup at the junction lines the items of information carried by the intermediate junction lines. A switch such as $CS_1$ receives a link emanating from each network line $CT_1$ to $CT_N$, since, for each junction line, there is only one connection with a network line during a secondary time-division channel. This connection is taken from the wires 1 to N; the number of outputs of $CS_1$ is given by the number $N_1$ of junction lines, each junction line being independent of the others.

It is therefore a stage of which each switch has N inputs and $N_1$ outputs. There are 1,024 switches CS to take account of the fact that, during a sampling period, the network of gates, of which there is only one, occupies 1,024 successive positions during the 1,024 secondary time-division channels. It is a question of a perfect linked system, each secondary junction group being accessible by a single link emanating from a primary junction group CT.

Figure 6:
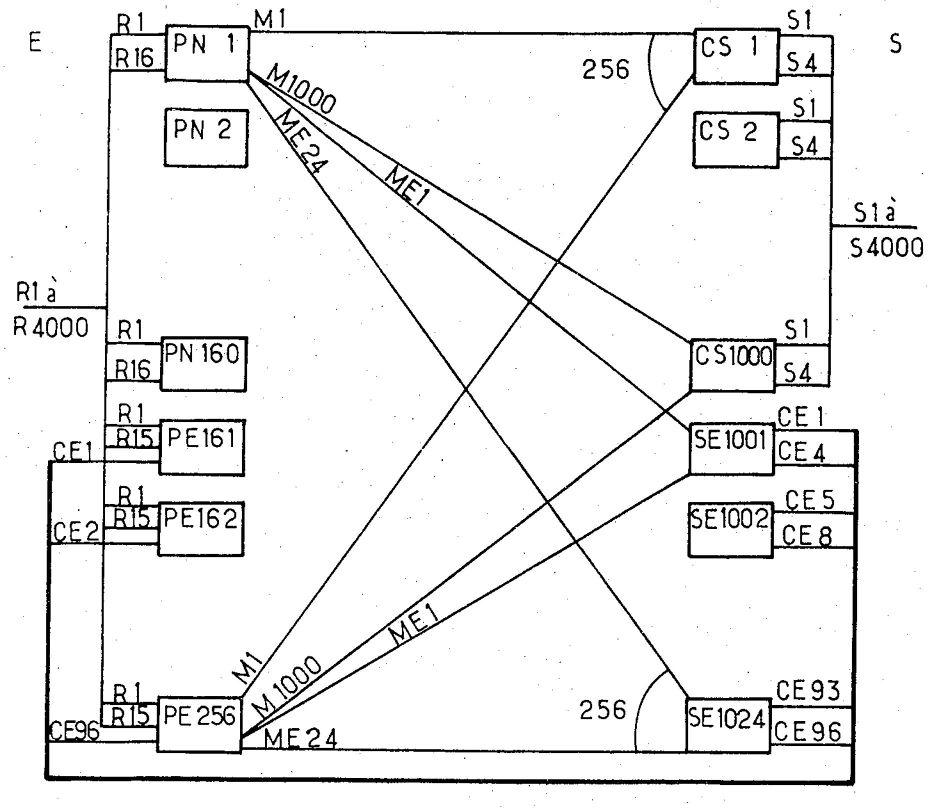
FIG. 6 is an exemplary space-division representation of the reciprocal overthrow.

FIG. 6 shows by way of example a diagram illustrating on a space-division basis, a connecting network having blocking characteristics and reciprocal overthrow for 4,000 network lines.

It is known to obviate the internal blocking of a network by reciprocal overthrow in such manner that it does not ultimately and systematically result in a loss of communication. The reciprocal overthrow performs the following function. If the call cannot be serviced from the original primary junction group, i.e., from the junction group in which it arises, it is then sent back to another primary junction group of the input stage which is capable of servicing the call effectively. Thus, when a blocked condition exists, the reciprocal overthrow device reintroduces a call at the input in order that it may be successfully completed. It therefore follows that the traffic offered to the reciprocal overthrow is the traffic refused by the normal group without the use of the reciprocal overthrow.

The network according to the invention, as described by way of example, is composed as follows. On the incoming side E there are 256 primary junction groups, including 160 from PN.1 to PN.160 having 16 incoming circuits $R_1$ to $R_{16}$ per junction group and 96 junction groups with reciprocal overthrow PE.161 to PE.256 having 15 incoming circuits $R_1$ to $R_{15}$ per junction group and also one reciprocal overthrow circuit per junction group.

There are therefore in all (160×16)+(96×15)=4,000 incoming circuits and 96 reciprocal overthrow circuits.

On the outgoing side S, there are 1,000 secondary junction groups from $CS_1$ to $CS_{1,000}$, each of which has four outputs $S_1$ to $S_4$, which represents 4,000 outputs. In addition, the 24 reciprocal overthrow junction groups SE.1001 to SE.1024 each give an outlet to four reciprocal overthrow circuits such as $CE_1$ to $CE_4$, i.e., 96 reciprocal overthrow outlets.

Of each primary junction group PN.1 to PN. 160 and PE.161 to PE.256, there are 1,000 links $M_1$ to $M_{1000}$ which are distributed among the 1,000 secondary junction groups $CS_1$ to $CS_{1000}$ and 24 reciprocal overthrow selectors SE.1001 to SE.1024. Each secondary junction group such as $CS_1$ therefore receives 256 direct links coming from the incoming circuits and each reciprocal overthrow selector also receives 256 reciprocal overthrow links coming from the incoming circuits.

The reciprocal overthrow circuits $CE_1$ to $CE_{96}$ emanating from the 24 reciprocal overthrow selectors SE.1001 to SE.1024 are introduced at the input in a proportion of one reciprocal overthrow circuit such as $CE_1$ per primary mixed junction group such as PE.161.

It will be assumed by way of example that a call at the primary junction group $PN_1$ is to be routed to the outlet $S_1$ emanating from the secondary junction group $CS_1$. If the link $M_1$ which connects $PN_1$ to $CS_1$ is already occupied by another call, blocking occurs and it is necessary to find another channel. A free link is chosen from the reciprocal overthrow links accessible from the primary section $PN_1$ in which the call is engated. It will be assumed by way of example that this is the link $ME_{24}$. The link $ME_{24}$ is in addition that one which possesses a reciprocal overthrow selector SE.1024 giving access to a mixed primary junction group having a free link $M_1$ towards the secondary junction group $CS_1$, of which one outlet is the desired direction $S_1$.

The transposition of the reciprocal overthrow (which has just been described with reference to FIG. 6 in the case of space-division switching) to time-division switching takes place without difficulty (see FIG. 3).

The chain line ENT (FIG. 3) represents the reciprocal overthrow in time-division switching. It comprises, for the network taken by way of example, 96 outlets ($CE_1$ to $CE_{96}$, FIG. 6) taken from the junction lines in a proportion of 24 secondary channels per junction line. The secondary channels are repositioned at the input of the network lines, for example, as indicated in FIG. 6, as the 16th input of the primary junction groups from PE.161 to PE.256.

The distribution given for the reciprocal overthrow circuits among the primary junction groups and the secondary junction groups has been chosen by way of example. It is equally possible to take only one reciprocal overthrow circuit per secondary junction group and there are then 96 mixed secondary junction groups. Likewise, all the reciprocal overthrow circuits may be returned to specialized primary junction groups and there are then 6 specialized primary junction groups. This method is easier to put into practice.

Of course, the invention is in no way limited to the embodiment described and illustrated, which has been referred to only by way of example. More particularly, details may be modified, certain arrangements may be changed and certain means may be replaced by equivalent means without departing from the scope of the invention.

What is claimed is:

1. A high-capacity connecting network in the form of a linking system for time-division switching having blocking and reciprocal overthrow characteristics comprising:

a. a plurality of incoming network lines;

b. a plurality of buffer memories each of said buffer memories corresponding to one of said incoming network lines;

c. a plurality of junction lines associated with said buffer memories;

d. a plurality of control memories, each of said control memories corresponding to one of said junction lines;

e. a plurality of groups of outgoing network lines;

f. a plurality of intermediate junction lines, each of said intermediate junction lines corresponding to one of said buffer memories, wherein each of said buffer memories is capable of storing the items of information or words contained in 16 primary time division channels, each primary time division channel being multiplexed into 32 secondary time-division channels on said intermediate junction line;

g. word address lines and memory address lines associated with each of said control memories, wherein said memory address line carries the address of the buffer memory from which the information is to be taken for each secondary time-division channel and wherein said word address line carries the address of the word in that buffer memory and wherein the memory address lines and word address lines are connected to said buffer memories through a logic circuit, said logic circuit comprising:

1. a plurality of first AND gates, each first AND gate having one input connected to one word address line and another input connected to a decoder means;
2. a plurality of first OR gates, each first OR gate associated with one of said buffer memories wherein the outputs of said first AND gates are applied to the inputs of said first OR gates, whereby one of said first AND gates and one of said first OR gates are simultaneously opened during a common secondary time-division channel;

h. said decoder means being associated with each of said memory address lines whereby the output of said control memories is applied to said word address lines and said memory address lines, such that the items of information stored in one of said primary time-division channels of a buffer memory is applied to the corresponding intermediate junction line and wherein the signal on said intermediate junction line is applied to an appropriate outgoing network line; and i. a plurality of distributor means, each said distributor means connected to one junction line and one group of outgoing network lines, wherein words received on one of said network lines and stored in one of said buffer memories cannot be read from two of said junction lines on a common secondary time-division channel.

2. A connecting network according to claim 1, wherein said intermediate junction lines are connected to one input of a group of second AND gates, the other input of said group of second AND gates being connected to one of the outputs of said decoders, the outputs of said group of second AND gates being connected to one input of a second OR gate, the output of which constitutes a junction line, whereby said second OR gate and one of said second AND gates are simultaneously opened during a common secondary time-division channel.

3. The connecting network according to claim 2, wherein each junction line comprises a number of secondary time-division channels and wherein a number of said secondary time-division channels and line are allotted to the reciprocal overthrow and reintroduced at the input of a certain number of network lines such that a new access channel towards the desired outgoing network lines can be found if there is internal blocking of the network.

4. A connecting network according to claim 2 which comprises:

a. N of said buffer memories, one per incoming line, each having P memories, one per time-division channel, which are themselves composed of Q elemental memory bits, in which there are temporarily stored the P×N words contained in the N incoming network lines;

b. $N_1$ of said junction lines, in each of which there are time-multiplexed the $P\times N_2$ words intended for a group of $N_2$ outgoing network lines ($N_1N_2 \geqslant N$);

c. $N_1$ of said control memories, each of which contains the addresses of the buffer memory and of that word of this buffer memory at which it is necessary to seek the Q bits intended for each of the time-division channels of the $N_2$ outgoing network lines of the group served by a junction line associated with a control memory;

d. $N_1$ of said distributor means which route from the junction lines the words intended for the $N_2$ network lines of the group;

e. $N_1$ of said word address lines and $N_1$ memory address lines of each control memory which emanate from a word address line and a memory address line;

f. $N_1$ of said decoders for distributing the memory addresses among the N buffer memories;

g. $N_1\times N$ of said first AND gates for distributing the digit P among the N buffer memories from the $N_1$ control memories;

h. N of said first OR gates for distributing a single digit P to a buffer memory at a given instant;

i. N of said intermediate word address lines between the first OR gates and the buffer memories;

j. N of said intermediate junction lines coming from the buffer memories for distributing among the various junction lines the Q bits contained in the buffer memory word of address p;

k. $N_1\times N$ of said second AND gates opening to the aforesaid Q bits of information of the intermediate junction line, the path of the junction line corresponding to the control memory in which the digit *p* was stored;

l. $N_1$ of said second OR gates effecting the regrouping in the junction lines of the items of information coming from the various buffer memories.

* * * * *